United States Patent [19]
Justice

[11] Patent Number: 6,000,635
[45] Date of Patent: Dec. 14, 1999

[54] EXHAUST NOZZLE FOR A TURBOJET ENGINE

[75] Inventor: Stephen G. Justice, Canyon Country, Calif.

[73] Assignee: Lockheed Martin Corporation, Palmdale, Calif.

[21] Appl. No.: 08/537,964

[22] Filed: Oct. 2, 1995

[51] Int. Cl.⁶ .................................................. F02K 1/12
[52] U.S. Cl. ..................................................... 239/265.33
[58] Field of Search ..................... 239/265.35, 265.37, 239/265.17, 265.11, 265.33; 60/228, 230, 232, 271

[56] References Cited

U.S. PATENT DOCUMENTS

| | | | |
|---|---|---|---|
| 3,019,601 | 2/1962 | Sens | 60/35.55 |
| 3,174,582 | 3/1965 | Duthion et al. | 239/265.17 X |
| 3,702,681 | 11/1972 | Hasbrouck | 239/265.17 |
| 4,375,276 | 3/1983 | Konarski | 60/232 X |
| 4,448,354 | 5/1984 | Reznick | 239/265.17 |
| 4,747,542 | 5/1988 | Cires et al. | 239/265.17 X |
| 4,778,109 | 10/1988 | Jourdain et al. | 239/265.35 X |
| 5,115,979 | 5/1992 | Ellehorst et al. | 239/265.35 X |
| 5,288,020 | 2/1994 | Pirker | 239/127.3 |

FOREIGN PATENT DOCUMENTS 2055333   3/1991   United Kingdom ............. 239/265.35

*Primary Examiner*—Kevin Weldon
*Attorney, Agent, or Firm*—Robert A. Schruhl

[57] ABSTRACT

The invention is an exhaust nozzle for an after-burning turbojet engine having an exhaust passage mounted in an aircraft, The exhaust nozzle includes a duct having an open first end coupled to the exhaust passage of the turbojet engine, a open second end, and a generally shallow U shape from the first end to the second end. The duct includes top, bottom and side walls, the top and bottom walls converging toward and diverging away from each other along the length of duct from the first to second ends and with the minimum cross-sectional area of the duct or throat positioned down stream of the lowest point of the V. The top wall is pivotally mounted to the aircraft at the first end of the duct so that the throat cross-sectional area can be adjusted to accommodate the increased gas flow when the after-burner is in operation. The bottom wall aft of the throat includes a surface contour for producing a coanda effect.

8 Claims, 3 Drawing Sheets

EXHAUST NOZZLE FOR A TURBOJET ENGINE

BACKGROUND OF THE INVENTION

1. Field of the Invention

The invention relates to the field of exhaust nozzles for turbojet engines mounted in aircraft and, in particular, to a tow dimensional exhaust nozzle for a after-burning turbojet engine.

2. Description of Related Art

The typical exhaust system for a conventional turbojet engine having an after burner includes a circular exhaust duct aft of the engine wherein fuel is injected and burned an ejected out an adjustable nozzle. The nozzle is adjustable so that that sonic flow can be achieved at the exit (end) thereof improving efficiency at any given thrust setting. The nozzle comprises a series of over lapping curved plates pivoted at their forward ends. Nozzle cross-sectional area is varied by rotation of plates inward toward the center line of the duct. Such a design is disclosed in U.S. Pat. No. 3,702,661 "Blow-In-Door For Afterburner Nozzle" by A. Hasbrouck, et al. In U.S. Pat. No. 3,080,711 "Penshape Exhaust Nozzle For Supersonic Engine" by J. F. Connors, as the title implies, a nozzle is disclosed having a pen shape wherein the area of the throat is controlled by a movable single, or a double-ramp structure, or a clam shell element situated within the nozzle exit. The exhaust nozzle is curved so that hot sections of the engine are shielded from the exit reducing infrared delectability. However, while the disclosed designs provided the ability to change throat cross-sectional area to accommodate an after burner location at the aft end of the exhaust duct does not allow the use of a full deleval nozzle. In U.S. Pat. No. 5,288,020 "Seal Arrangement for Adjoining Walls of A Propulsion Nozzle For An Engine" by K. Pirker a two dimensional convergent-divergent nozzle is disclosed where in both the converging and diverging walls pivot about the throat. However, if the throat cross-sectional area is varied by moving the pivot axis of the top and bottom converging and diverging walls together, the over all length of the nozzle is changed, complicating the structural support required for the nozzle.

Thus it is a primary object of the subject invention to provide an exhaust nozzle for a turbojet engine mounted in an aircraft.

It is another primary object of the subject invention to provide a converging/diverging exhaust nozzle for a turbojet engine mounted in an aircraft.

It is a further object of the subject invention to provide a converging/diverging exhaust nozzle for a turbojet engine mounted in an aircraft wherein the throat cross-sectional area can be varied.

It is a still further object of the subject invention to provide a converging/diverging exhaust nozzle for turbojet engine incorporating an after-burner mounted in an aircraft wherein the throat cross-sectional area can be varied.

It is another object of the subject invention to provide a converging/diverging exhaust nozzle for turbojet engine incorporating an after-burner mounted in an aircraft wherein the throat cross-sectional area can be varied having simplified operating structure and operating system.

SUMMARY OF THE INVENTION

The invention is an exhaust nozzle for an after-burning turbojet engine mounted in an aircraft. The exhaust nozzle includes a duct having an open first end coupled to the exhaust passage of the turbojet engine and a open second end, and a generally shallow 10 degree V shape therebetween when viewed perpendicular to the flow direction. The top and bottom walls converge toward and away from each other forming a deleval nozzle with the minimum cross-sectional area or throat of the nozzle positioned down stream of the lowest point of the V. The top wall is pivotally mounted to the aircraft at the first end of the duct providing for adjustment of the flow area of the nozzle by rotation of the top wall upward or downward about the pivot axis. The exhaust nozzle has a sufficient vertical height from the center of the V to the first and second ends that, when combined with the contour of the top and bottom walls of duct, prevent the first end thereof from when viewed form from the second end. Thus, the hot turbine section of the turbojet engine can not be seen from a position aft of the aircraft reducing delectability from infrared seeking missiles and the like. The bottom wall aft of the throat has a contour for producing a coanda effect and includes a radius of at least 20 times the height of the throat height.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
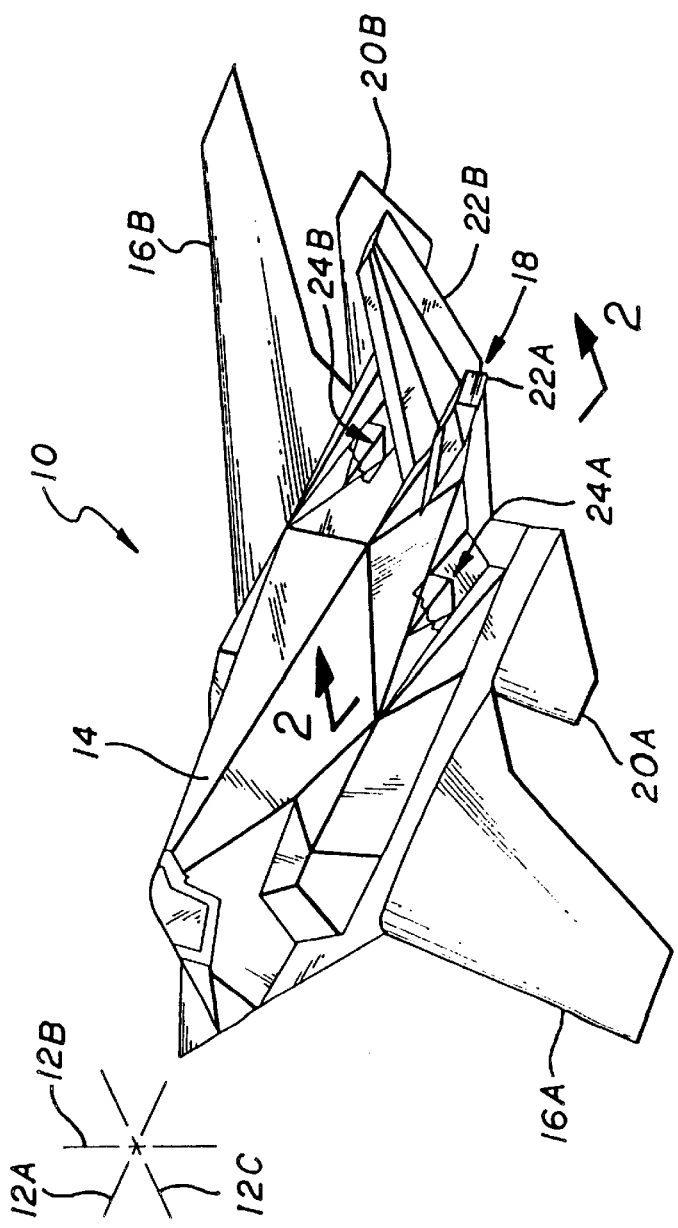
FIG. 1 is partial perspective view of the aft end of an aircraft having twin propulsion systems incorporating the subject exhaust nozzle
Figure 2:
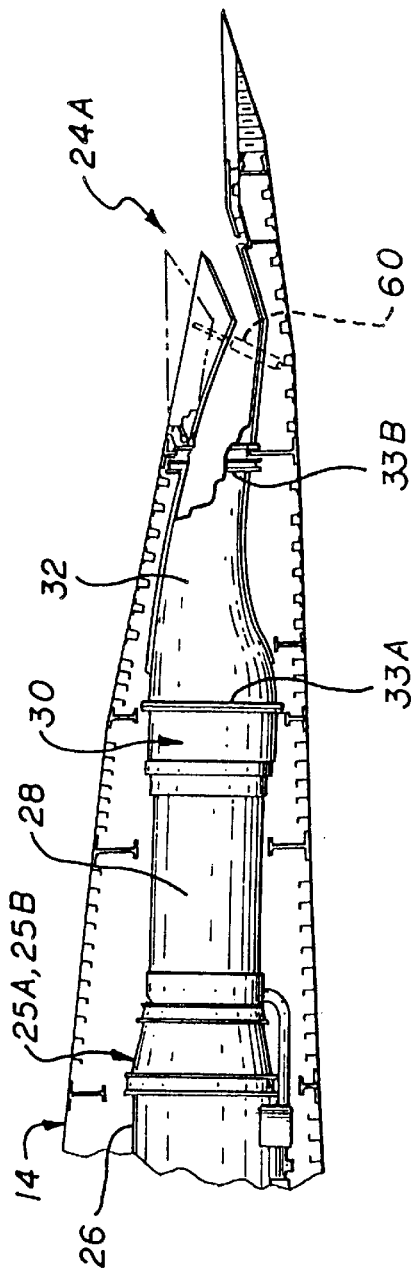
FIG. 2 is a cross-sectional view of one of the propulsion systems nozzle taken along the line 2—2 shown in FIG. 1.

Illustrated in FIG. 1 is a twin engine aircraft, generally indicated by numeral 10 having a longitudinal axis 12A, longitudinal axis 12B and a lateral axis 12C. The aircraft 10 includes a fuselage 14, wings 14A and 14B, tail portion 18 that incorporates horizontal stabilizers 20A and 20B and vertical stabilizers 22A and 22B. The subject exhaust nozzles, indicated by numerals 24A and 24B, are located in the tail portion 18 aft of the propulsion systems 25A and 25B (shown in dotted lines). Still referring to FIG. 1 and additionally to FIGS. 2, the propulsion systems 25A includes a turbojet engine 26 coupled to a transition duct 28 that, in turn, is coupled to an after-burner assembly 30. Coupled to the after-burner 30 is a tail pipe 32 that converges from a circular cross-section inlet to 33A to a two-dimensional (generally trapezoidal shaped) exit port 33B that couples to the exhaust nozzle 24A. Such propulsion systems, as so far described, are old in the art.

Figure 3:
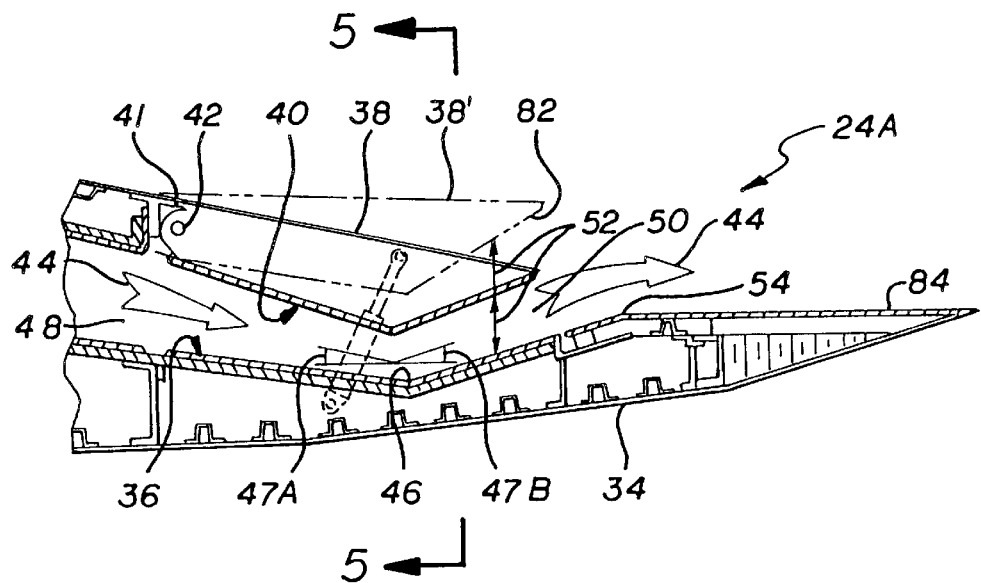
FIG. 3 is an enlarged view of a portion of the propulsion system shown in FIG. 2 particularly illustrating the exhaust nozzle.
Figure 4:
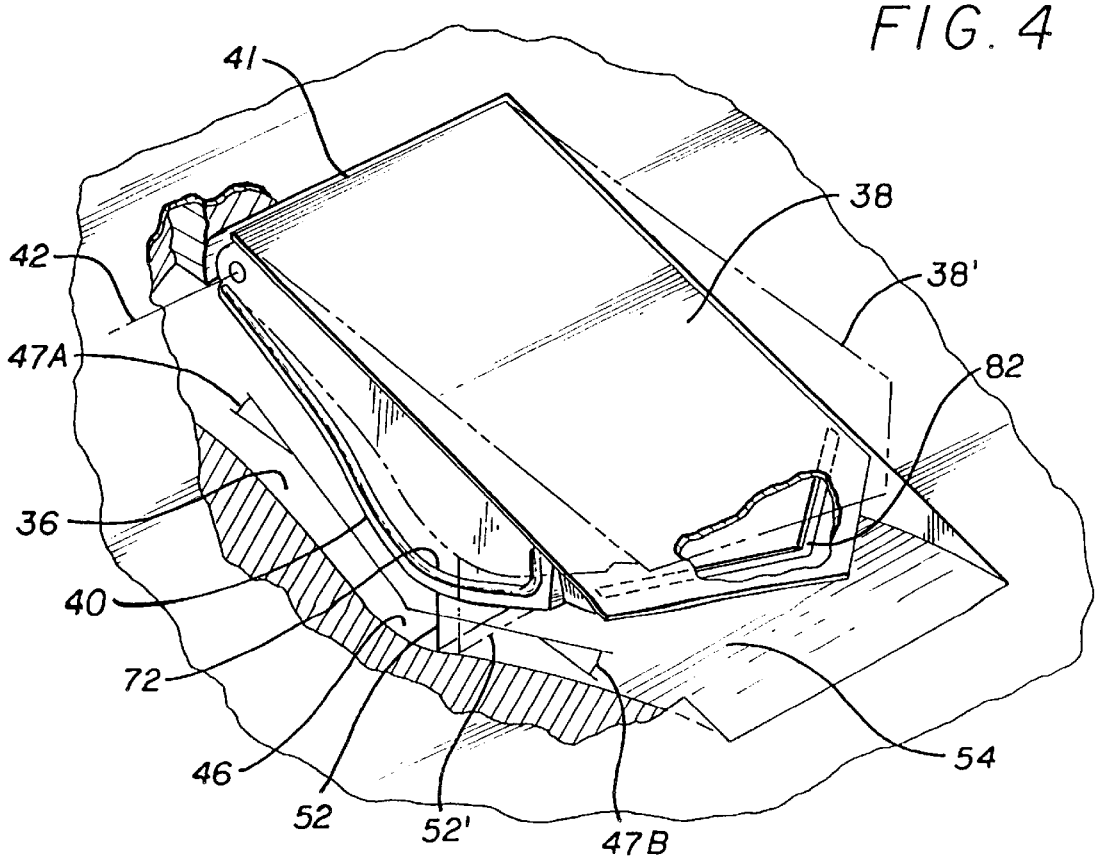
FIG. 4 is a simplified perspective view of the exhaust nozzle shown in FIG. 3.
Figure 5:
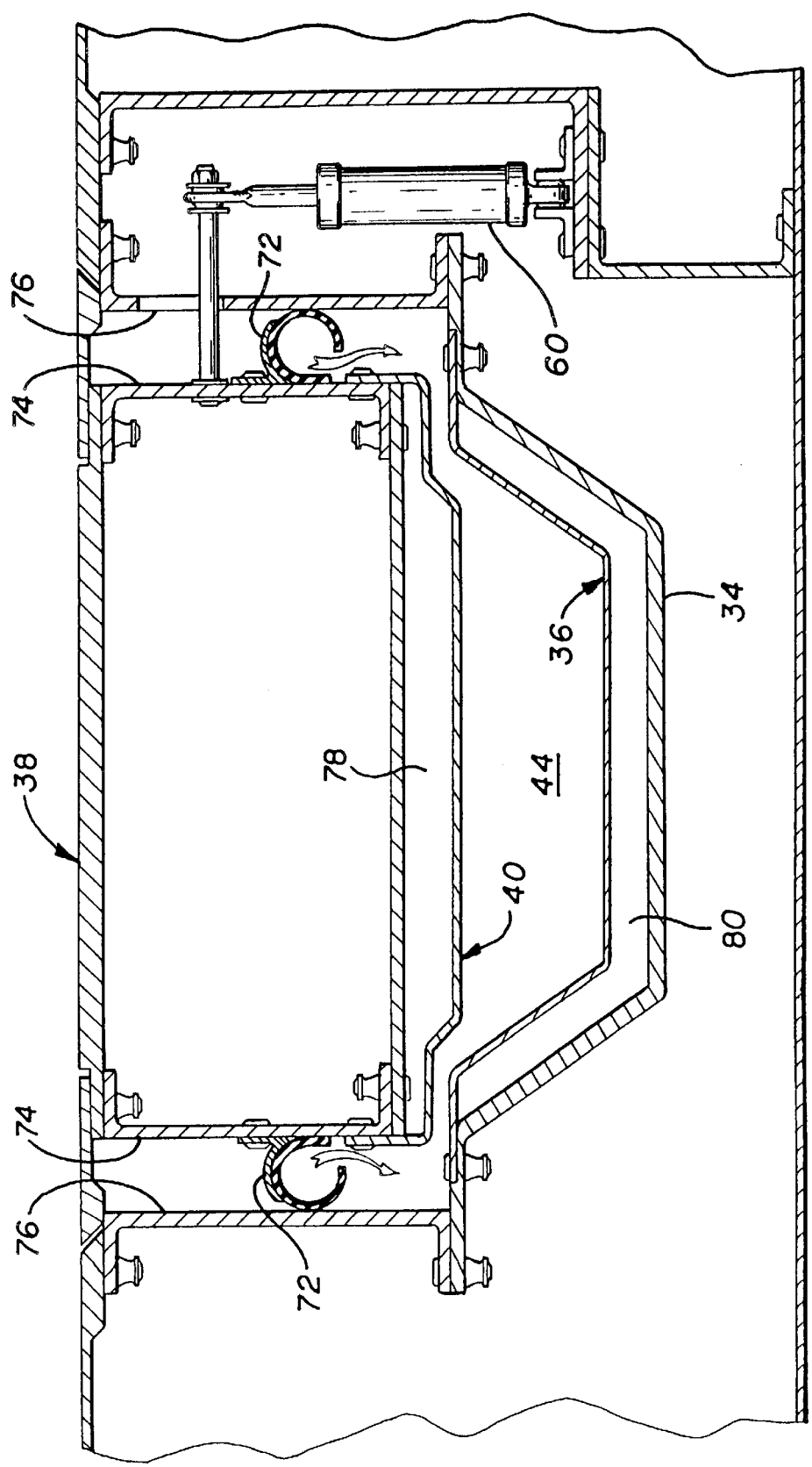
FIG. 5 is a partial cross-sectional view of FIG. 2, taken along the line 5—5.

Referring now to FIGS. 3–5, the exhaust nozzle 24A includes a lower structure 34 having a surface 36 and an upper structure 38, having a surface 40, that is pivotally mounted at its first end 41 for rotation about a pivot axis 42. The surfaces 36 and 40 form a flow path 44 that slopes initially downward and then upward in a general "U" shape with the bottom of the U indicated by numeral 46. The upward angles 47A and 47B of the flow path 44 are about 10 degrees. In addition, the surfaces 36 and 40 initially converge in the first portion 48 and then diverge in the second portion 50 creating a converging/diverging delavel nozzle with the throat 52 down stream of the bottom 46 of the U. The end portion 54 of the bottom surface 36 is curved so as to create a coanda effect when the exhaust gases are flowing.

When the after burner is in operation, it is necessary to increase the throat 52 cross-sectional area to accommodate the increased exhaust flow rate (the exhaust gases are expanded because of the increase in temperature). This is simply accomplished by rotating the upper structure 38 upward about the pivot point 42 to the position 38', increasing the throat area, indicated by numeral 52'. This is accomplished by means of actuator 60 attached between the aircraft structure and the upper structure 38.

Hot gases are prevented from leaking passed the upper structure 38 by means of a conventional pressurized seal assemblies 72 mounted on the "stepped" side walls 74 thereof. Bleed air from the compressor stages of the engine 26 is used to expand the seal against rub plates 76 and upon exiting the seal are mixed with the exhaust gases in the nozzle adding to the net thrust of the propulsion system. Additional bleed is air passed through ducts 78 and 80 to cool the surfaces 36 and 40 and which exits through ports 82 and 84 in the aft end of the nozzle also adding to the net thrust.

The advantages of this exhaust nozzle design are its simplicity of operation because of the use of a simple "flap" element to control throat area. Additionally, the U shaped flow path and coanda surface on the lower surface prevents a direct view of the hot parts of the engine from the aft end. This, in combination with the two-dimentional exhaust duct reduce the infra red signature of the aircraft.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft industry and, in particular to the military aircraft industry.

I claim:

1. An exhaust nozzle for an after-burning turbojet engine mounted in an aircraft, said turbojet engine having an exhaust passage, the exhaust nozzle comprising a duct having an open first end coupled to the exhaust passage of the turbojet engine, a second end, and a generally shallow U shape from said first end to said second end, said duct having top, bottom and side walls, said top and bottom walls converging toward and diverging away from each other along the length of duct from said first to said second ends, said top wall pivotally mounted to the aircraft at said first end of said duct and said bottom wall in a fixed position.

2. The exhaust nozzle as set forth in claim 1 comprising the minimum cross-sectional area of said duct positioned down stream of the lowest point of said U.

3. The exhaust nozzle as set forth in claim 2 comprising said bottom wall aft of said minimum cross-sectional area having a surface contour for producing a coanda effect.

4. The exhaust nozzle as set forth in claim 3 wherein said top wall is movable toward and away from said bottom wall.

5. The exhaust nozzle as set forth in claim 4 wherein said exhaust passage includes a longitudinal axis and the exhaust gas flow path is along said longitudinal axis and said exhaust nozzle is aligned with the longitudinal axis of the exhaust passage.

6. The exhaust nozzle as set forth in claim 5 wherein said exhaust nozzle has a sufficient vertical height from said center of said U to said first and second ends such that said first end is not visible from said second thereof.

7. The exhaust nozzle as set forth in claim 6 wherein said surface contour for producing a coanda effect of said bottom wall aft of said minimum cross-sectional area has a radius of at least 20 times the height of the said minimum cross-sectional area of said duct.

8. The exhaust nozzle as set forth in claim 7 wherein the slope of the duct upward for and aft of the bottom of the U is about 10 degrees.

\* \* \* \* \*